(12) United States Patent
Sterin

(10) Patent No.: US 8,196,210 B2
(45) Date of Patent: Jun. 5, 2012

(54) SOFTWARE LICENSE COMPLIANCE

(75) Inventor: Mark Sterin, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 959 days.

(21) Appl. No.: 12/045,655

(22) Filed: Mar. 10, 2008

(65) Prior Publication Data

US 2009/0228984 A1    Sep. 10, 2009

(51) Int. Cl.
 G06F 7/04 (2006.01)
 G06F 17/30 (2006.01)
 G06F 21/00 (2006.01)
 G06Q 10/00 (2012.01)
 G06Q 30/00 (2012.01)
(52) U.S. Cl. .................. 726/26; 726/28; 705/59
(58) Field of Classification Search .......... 726/26, 726/28; 705/59
 See application file for complete search history.

(56) References Cited

U.S. PATENT DOCUMENTS

| 5,790,664 | A  | * | 8/1998  | Coley et al. ............. 709/203 |
| 2004/0039594 | A1 |  | 2/2004  | Narasimhan et al. |
| 2004/0167859 | A1 | * | 8/2004  | Mirabella ............. 705/59 |
| 2004/0249762 | A1 |  | 12/2004 | Garibay et al. |
| 2005/0049973 | A1 |  | 3/2005  | Read et al. |
| 2005/0071281 | A1 |  | 3/2005  | Faur et al. |
| 2006/0059099 | A1 | * | 3/2006  | Ronning et al. ........... 705/59 |
| 2006/0229994 | A1 |  | 10/2006 | Moulckers et al. |
| 2006/0293942 | A1 |  | 12/2006 | Chaddha et al. |
| 2007/0026942 | A1 |  | 2/2007  | Kinsley et al. |
| 2007/0130082 | A1 |  | 6/2007  | Coley et al. |
| 2007/0204078 | A1 |  | 8/2007  | Boccon-Gibod et al. |
| 2008/0183626 | A1 | * | 7/2008  | Romero et al. ........... 705/59 |

FOREIGN PATENT DOCUMENTS

WO   WO0116674 A1   3/2001
WO   WO 2011015441 A1 *  2/2011

OTHER PUBLICATIONS

Thompson, C.W.; Jena, R.; "Digital licensing [software reuse]"; Internet Computing, IEEE vol. 9 , Issue: 4; Digital Object Identifier: 10.1109/MIC.2005.77; Publication Year: Jul. 2005 , pp. 85-88.*
Marshall, "Enterprise Compliance Manager", ManageSoft Corp, 2007, pp. 1-2.
"Novell ZENworks Asset Management", Novell Inc., 2007, p. 1.

* cited by examiner

*Primary Examiner* — Matthew Smithers
*Assistant Examiner* — Courtney Fields

(57) ABSTRACT

Aspects of the subject matter described herein relate to software license compliance. In aspects, a configuration manager receives an indication of an intent of an software-related action and determines that a license may affect the action. The configuration manager consults with a license needs calculation engine that determines whether additional licenses are needed to perform the action. If additional licenses are needed, the configuration manager consults with a rules engine to determine whether the action is to be allowed. The rules engine applies one or more business rules to the licenses needed data and indicates a response to the intent. In either case, the configuration manager may provide information to an administrator and others regarding the action and may allow or disallow the action as indicated by the rules. If the administrator determines to take the action, the configuration manager may create an audit record.

20 Claims, 4 Drawing Sheets

SOFTWARE LICENSE COMPLIANCE

BACKGROUND

License tracking and enforcement is a long-standing challenge in the software industry. Small institutions and large institutions alike may spend considerable resources and personnel to ensure compliance. For example, some financial institutions employ a team of employees full-time to ensure that the institution is compliant with software licenses.

Some software licenses allow a company to exceed a given number of licenses as long as the company pays for any excess licenses. Determining the excess licenses needed may be performed during an audit. Auditing license use, however, may be expensive and time consuming and may also contribute to customer dissatisfaction.

SUMMARY

Briefly, aspects of the subject matter described herein relate to software license compliance. In aspects, a configuration manager receives an indication of an intent of an software-related action and determines that a license may affect the action. The configuration manager consults with a license needs calculation engine that determines whether additional licenses are needed to perform the action. If additional licenses are needed, the configuration manager consults with a rules engine to determine whether the action is to be allowed. The rules engine applies one or more business rules to the licenses needed data and indicates a response to the intent. In either case, the configuration manager may provide information to an administrator and others regarding the action and may allow or disallow the action as indicated by the rules. If the administrator determines to take the action, the configuration manager may create an audit record.

This Summary is provided to briefly identify some aspects of the subject matter that is further described below in the Detailed Description. This Summary is not intended to identify key or essential features of the claimed subject matter, nor is it intended to be used to limit the scope of the claimed subject matter.

The phrase "subject matter described herein" refers to subject matter described in the Detailed Description unless the context clearly indicates otherwise. The term "aspects" is to be read as "at least one aspect." Identifying aspects of the subject matter described in the Detailed Description is not intended to identify key or essential features of the claimed subject matter.

The aspects described above and other aspects of the subject matter described herein are illustrated by way of example and not limited in the accompanying figures in which like reference numerals indicate similar elements and in which:

DETAILED DESCRIPTION

Exemplary Operating Environment

Figure 1:
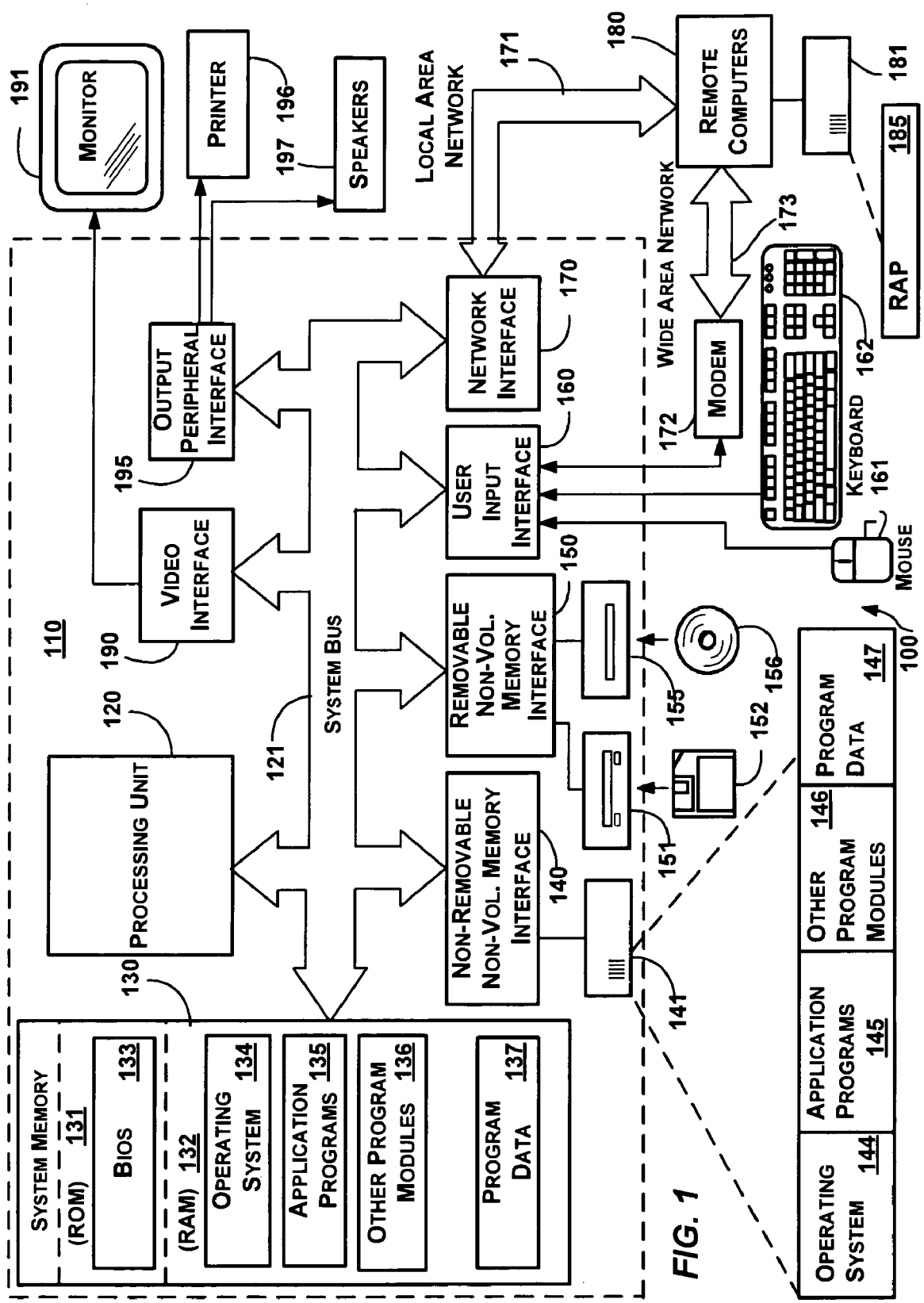
FIG. 1 is a block diagram representing an exemplary general-purpose computing environment into which aspects of the subject matter described herein may be incorporated.

FIG. 1 illustrates an example of a suitable computing system environment 100 on which aspects of the subject matter described herein may be implemented. The computing system environment 100 is only one example of a suitable computing environment and is not intended to suggest any limitation as to the scope of use or functionality of aspects of the subject matter described herein. Neither should the computing environment 100 be interpreted as having any dependency or requirement relating to any one or combination of components illustrated in the exemplary operating environment 100.

Aspects of the subject matter described herein are operational with numerous other general purpose or special purpose computing system environments or configurations. Examples of well known computing systems, environments, and/or configurations that may be suitable for use with aspects of the subject matter described herein include, but are not limited to, personal computers, server computers, handheld or laptop devices, multiprocessor systems, microcontroller-based systems, set top boxes, programmable consumer electronics, network PCs, minicomputers, mainframe computers, virtual machines, virtual hardware, distributed computing environments that include any of the above systems or devices, physical and/or virtual, and the like.

Aspects of the subject matter described herein may be applied to a virtual environment including one or more virtual machines, virtual hardware, or portions thereof. A virtual machine is a machine that, to at least some software executing on the virtual machine, appears to be a physical machine and/or a particular operating system. A physical machine which is represented via a virtual machine may or may not correspond to an actual physical machine and a virtual operating system may or may not correspond to an actual operating system. Software executing in a virtual environment may save files in a virtual storage device such as virtual hard drive, virtual floppy disk, and the like, may read files from a virtual CD, may communicate via a virtual network adapter, and so forth.

More than one virtual machine may be hosted on a single computer. That is, two or more virtual machines may execute on a single physical computer. To at least some software executing in each virtual machine, the virtual machine appears to have its own hardware even though the virtual machines hosted on a single computer may physically share one or more physical devices with each other and with the hosting operating system.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote and/or virtual processing devices that are linked through a communications network. In a distributed computing environment, program modules may be located in both local and remote computer storage media including memory storage devices.

With reference to FIG. 1, an exemplary system for implementing aspects of the subject matter described herein includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile discs (DVDs) or other optical disk storage, magnetic cassettes, magnetic tape, magnetic disk storage or other magnetic storage devices, or any other medium which can be used to store the desired information and which can be accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disc drive 155 that reads from or writes to a removable, nonvolatile optical disc 156 such as a CD ROM or other optical media. Other removable/non-removable, volatile/nonvolatile computer storage media that can be used in the exemplary operating environment include, but are not limited to, magnetic tape cassettes, flash memory cards, digital versatile discs, digital video tape, solid state RAM, solid state ROM, and the like. The hard disk drive 141 is typically connected to the system bus 121 through a non-removable memory interface such as interface 140, and magnetic disk drive 151 and optical disc drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Licenses

As mentioned previously, license tracking and enforcement is a long-standing challenge in the software industry. For example, for information technology (IT) departments, a major concern is how to meet service level agreements while remaining in compliance with license constraints. Often an IT employee has little or no idea of what licenses arrangements have been made by business managers within the business. An IT employee is faced with a task of satisfying customers and other employees and is charged with "solving the problem."

The inventor of the subject matter of the present application has analyzed various licenses and created a taxonomy whereby licenses may be classified. Specifically, the inventor has determined that licenses may affect at least one or more of deployment, configuration, and authorization/access policies.

Currently, many software licenses are based on installation. When a customer installs a software product, the customer is expected to pay for the software license even if the customer does not ever actually use the software product. This is sometimes referred to as a "deployment" software license. One example of a deployment software license is firmware which almost always ships with the hardware with which it is associated. As another example, in the past and currently, many software vendors have used and still use the deployment software license model to license their off-the-shelf software products.

A count based license relates to software that is licensed based on a count. For example, the count may involve a number and type of resources used such as processors or CPU "slices", memory, hard disk space consumed, energy utilized by physical devices, and the like. As another example, the count may involve a number of concurrent users where the identity of the users is irrelevant, but the number of concurrent users is relevant. For example, a database vendor may have a license that involves charges for the number of concurrent users regardless of who the users are. As another example, a count may involve a number of mailboxes that are allowed, in use, the maximum number that are concurrently in use over a period of time, and the like.

A count based license may be based on some number associated with a company. For example, a license may charge an automobile maker based on the number of automobiles the automobile maker produces. As another example, a license may charge a company based on the revenue of the company. These licenses may involve software in that the software may optimize the production of automobiles or may be related to the revenue of the company.

Some software licenses are based on access. Access based licenses may lock a license to an authenticated security principal such as a group, user, device, or the like, for example. For example, some computer aided design (CAD) software vendors charge a fee for the number of possible or actual concurrent accesses by different security principals to the software product. Such licenses may not have a restriction on how many times the software is installed (e.g., the software may be installed on many machines) or even on a raw count of how many instances of the software are used at one time (e.g., each user may use multiple instances of the software at one time), but may rather involve how many simultaneous security principals may or actually do use the software at one time. This is sometimes referred to as an "authorization/access" license.

Another example of an access based license is a cell phone license arrangement. When a cell phone accesses a cell phone network, charges begin accruing. The license may be structured as pay-as-you-go, prepaid, pay once, other payment plans, and the like.

An authorization/access based license may authenticate a user and/or device. For example, when a cell phone accesses a cell phone network, the cell phone authenticates with the network and access is granted based thereon. As far as the cell phone network is concerned, it is irrelevant who is using the cell phone to make a call.

Conversely, when logging into an online service, the device that connects to the online service may be irrelevant from the license perspective. Instead, a user is authenticated and the license is based on the user accessing the online service.

A license may involve a combination of two or more of the above licensing models. For example, a company may charge for each server upon which a product is installed (e.g., a deployment license fee), for each "seat" per month (e.g., an access based license fee), and may also charge a certain percentage of revenue of the company (e.g., a count based license fee).

As another example, a company may charge for installation of software on a server and may then charge license fees for the number of user accessing the server. This is a model that is sometimes used with e-mail servers and clients connecting to the e-mail server.

As mentioned previously, licensing may impact at least three distinct disciplines within a company: software deployment policy, authorization/access policy, and count-based policy.

What is deployed in a company may be constrained by what has been paid for, what the company intends to pay for, what the company has budgeted for, and the like.

How the software is configured may also be constrained by a license agreement. For example, the number of mailboxes supported by an e-mail server may be affected by license terms.

The authorization/access policy may be enforced by one or more components that execute on company servers. For example, Active Directory may enforce an authorization/access policy. This policy may be directly tied to a license agreement. As another example, Active Directory Federation Services may be used to enforce an authorization/access policy for user that access resources over the Internet. The one or more components may control which people and/or groups have access to which software and/or features within that software.

Figure 2:
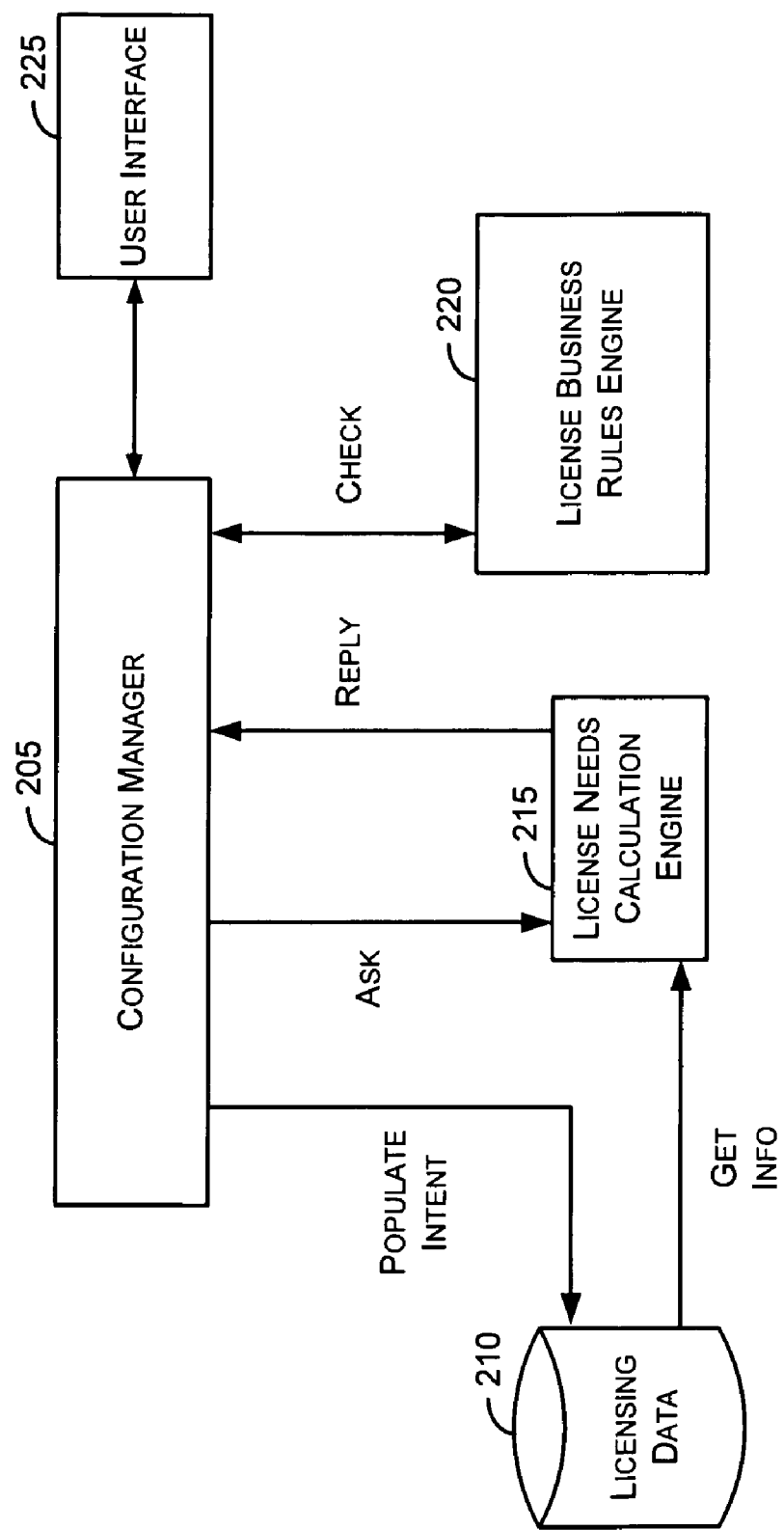
FIG. 2 is a block diagram representing an exemplary environment in which aspects of the subject matter described herein may be implemented.

FIG. 2 is a block diagram representing an exemplary environment in which aspects of the subject matter described herein may be implemented. The environment includes a configuration manager 205, a licensing data store 210, a license needs calculation engine 215, a license business rules engine 220, and a user interface 225 and may also include other entities (not shown).

Where a line connects one entity to another, it is to be understood that the two entities may be connected (e.g., logically, physically, virtual, or otherwise) via any type of network including processes communicating on the same computer, a direct connection, a wireless connection, a local network, a non-local network, the Internet, some combination of the above, and the like.

The configuration manager 205 may comprise one or more components that may be used to deploy, configure, re-configure, maintain, and provide access or authorization to access software. The configuration manager 205 may be broken down into subcomponents that deploy, configure/reconfigure software, provide access or authorization to access software, and so forth. The deployment subcomponent may be further broken down into components that deal with operating system (OS) deployment, non-OS software deployment, data center automation deployment, virtual deployment scenarios, other deployment components, and the like.

The OS deployment component may be in charge of deploying operating systems while the software installation program may deploy non-OS products. The data center automation deployment component may deploy applications that are distributed across multiple machines that may also need to be configured to communicate with each other. For example, a data center automation component may install and configure a database server, an application server, a presentation server, and other components on various servers.

The configuration manager 205 may interact with a system administrator or the like via a user interface component 225. Hereafter, the term "administrator" is sometimes used to refer to a user that interacts with the user interface component 225 or some other component to provide input to the configuration manager 205.

When an administrator determines that the administrator wants to deploy new software, reconfigure existing software, or adjust other features of the software that are potentially affected by a license, the configuration manager 205 receives the administrator's intent through the user interface component 225. The configuration manager 205 then populates this intent in the licensing data store 210. An "intent" may be to have certain software deployed to certain machines, for example. As another example, an intent may be to have an e-mail server configured with a certain number of mail boxes or user accounts.

The configuration manager 205 may also be used to determine whether any licenses need to be purchased for an existing configuration. For example, it may be the case that an administrator wants to know the current state of licensing with regards to a current configuration. The configuration manager 205 may use the license needs calculation engine 215 to reconcile licenses used with licensed paid for and may provide an indication of additional licenses needed.

The licensing data store 210 comprises a data store in which data regarding licenses and software installation and configuration may be stored. The data store may be located on a single physical device or may be distributed across two or more physical devices. Examples of the physical devices upon which the data store 210 may be stored include the computer storage media described in conjunction with FIG. 1.

The licensing data store 210 may store entitlement data. Entitlement data includes data regarding licenses that have already been or will be purchased. The licensing data store 210 may also store type information about software. For example, the licensing data store 210 may include data that classifies software as freeware, commercial, shareware, or some other classification as well as information that indicates how to calculate licensing for each software product. For example, this information may indicate that software includes a per deployment and per access licenses or may indicate that a license is free for a virtual machine as long as a license is purchased for a physical machine. As another example, the information may indicate that reconfiguring the software product does not impact licensing needs as long as a license to deploy the software or some other software component is procured.

The licensing data store 210 may include code, script, actions, or the like (hereinafter sometimes generically referred to as code) that may be invoked to determine the license use and/or need of a particular software configuration. Code may be associated with each type of software for which the license needs calculation engine 215 is capable of calculating license needs.

The examples above are not intended to be all-inclusive or exhaustive. Indeed, based on the teachings herein, those skilled in the art will recognize many other examples of data that may be included in the licensing data store 210 without departing from the spirit or scope of aspects of the subject matter described herein.

The license needs calculation engine 215 is a component that receives a request from the configuration manager 205 and determines whether licenses are needed based on the request. The license needs calculation engine 215 retrieves data from the licensing data store 210 to determine whether more licenses are needed. The license needs calculation engine 215 may retrieve the intent, what products need to be licensed (e.g., some products could be free or a configuration change might not impact a licensing term), what the licensing model is (e.g., deployed, count-based, authorization/access, some combination, and the like), and other licensing information. The license needs calculation engine 215 may then collect other data (e.g., number of machines upon which software is installed, number of users granted access to software, configuration parameters, count of resources used, whether the software is installed on a virtual machine or not, etc.) add this to the intent and compare the total to entitlement information (e.g., number of paid for licenses) to determine if more licenses are needed.

The license needs calculation engine 215 may gather this information via agents installed in various locations and/or via agent-less techniques. As an example of an agent based technique, the license needs calculation engine 215 may communicate with a process that is able to determine the configuration of an e-mail server. As an example of an agent-less based technique, the license needs calculation engine 215 may collect information from an Active Directory server, a name server, Simple Network Management Protocol (SNMP), pinging certain ports on machines, and so forth.

The license needs calculation engine 215 may also gather information regarding the installation and configuration of software in virtual machines. In one embodiment, this may be done in manner similar to the way gathering information is done on a physical machine. In another embodiment, this may be done by scanning a file or other data structure that represents a virtual machine and collecting license information based thereon. In conjunction with gathering the information, the license needs calculation engine 215 may indicate (e.g., via a flag or otherwise) that the information relates to a virtual machine.

After calculating the license needs (if any), the license needs calculation engine 215 communicates the license needs to the configuration manager 205.

If licenses are needed, the configuration manager 205 then interacts with the license business rules engine 220 to determine what to do. The license business rules engine 220 applies business rules to the licenses needs to determine what to do about the license needs. Business rules may be any computer-encodable rule a business decides to implement regarding deployment, configuration, access, and so forth. The rule may stop the deployment of software or configuration changes, may allow the deployment but provide notification when not enough licenses are available, or may indicate any other actions a business deems needed regarding licensing of software.

The business rules may be specified in any language that the license business rules engine 220 is structured to read. One exemplary language is a lantern-based engine that includes syntax such as: "If" $Total_Deployed(Office_14) <$Total_Purchased(Office_14)*110% then "Warn Admin and Notify me" as an action item or "If $Total_Deployed (Office_14)>$Total_Purchased(Office_14)*110%" then "block the action and Notify me." Based on the teachings herein, those skilled in the art will recognize many other languages that may be used or created to express business rules. Such languages are also to be included within the scope and spirit of aspects of the subject matter described herein.

A business rule may be geographical in nature. For example, a business rule may state that products that have not been paid for may not be deployed in Japan but may be deployed in the United States because of different licensing terms, legal requirements, or the like. As another example, a business rule may comply with legal requirements for exporting a software product.

The configuration manager 205 may receive the information from the business rules engine 220 and may take actions indicated by the business rules as appropriate. If notifications are needed, the configuration manager 205 may provide notifications via the user interface component 225 and/or via e-mail or some other mechanism. The configuration manager 205 may prompt an administrator to indicate that the administrator is aware of the licensing needed by the intended deployment and/or configuration change and, if the administrator decides to proceed, to indicate this awareness (e.g., by clicking an "OK" button, a check box to "perform actions indicated by intent," or some other indication) and then store this indication and administrator identifier to provide an audit trail.

The configuration manager 205 may be able to provide an analysis of cost for the additional licenses. The configuration manager 205 may make this cost estimate based on per license cost values previously entered, per license costs entered contemporaneously by the administrator, per license costs obtained automatically via a network connection (e.g., from an online shopping site), other mechanisms, or the like.

Figure 3:
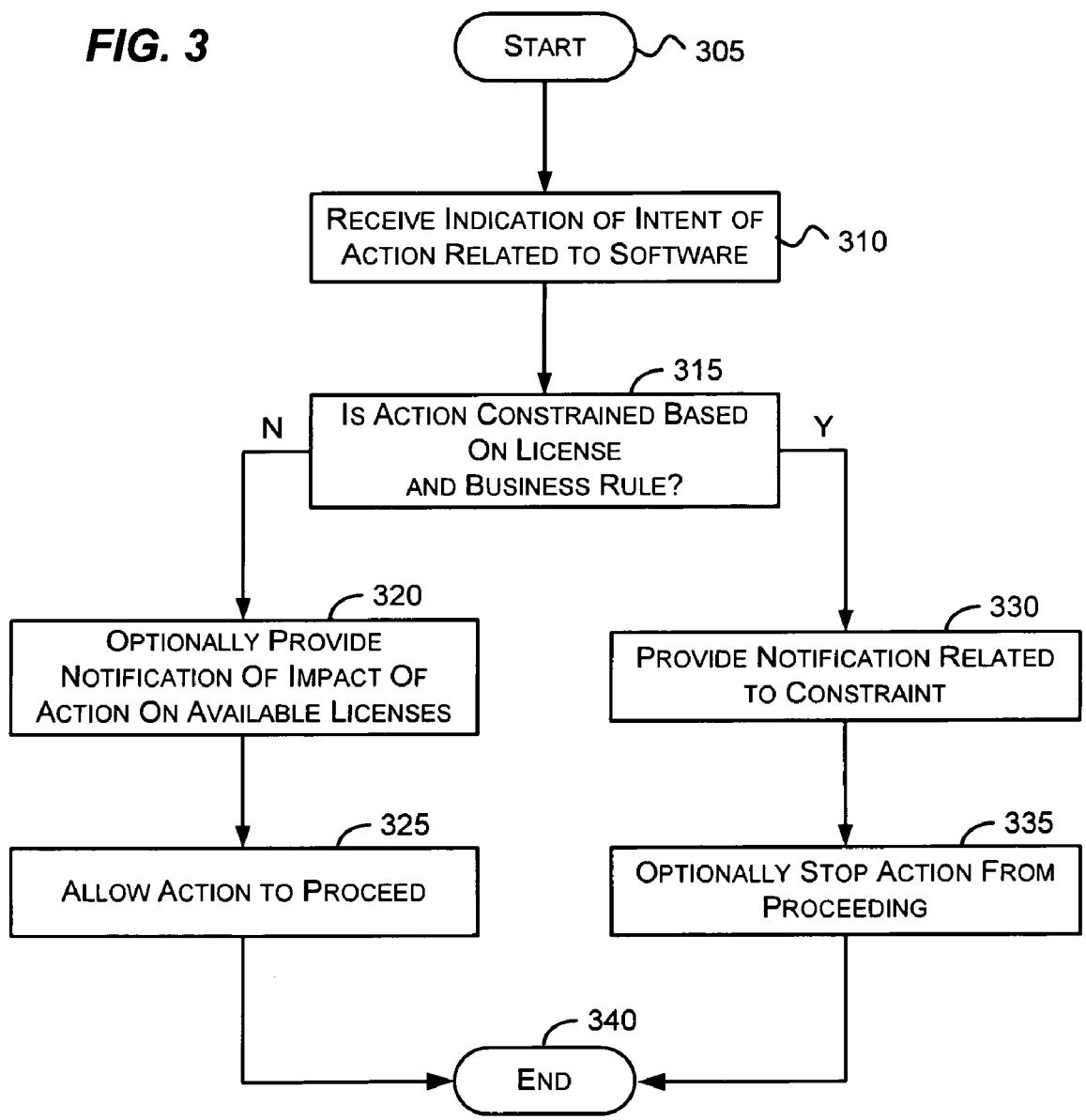
FIG. 3 is a flow diagram that generally represents actions that may occur in one exemplary embodiment in assuring software license compliance in accordance with aspects of the subject matter described herein.
Figure 4:
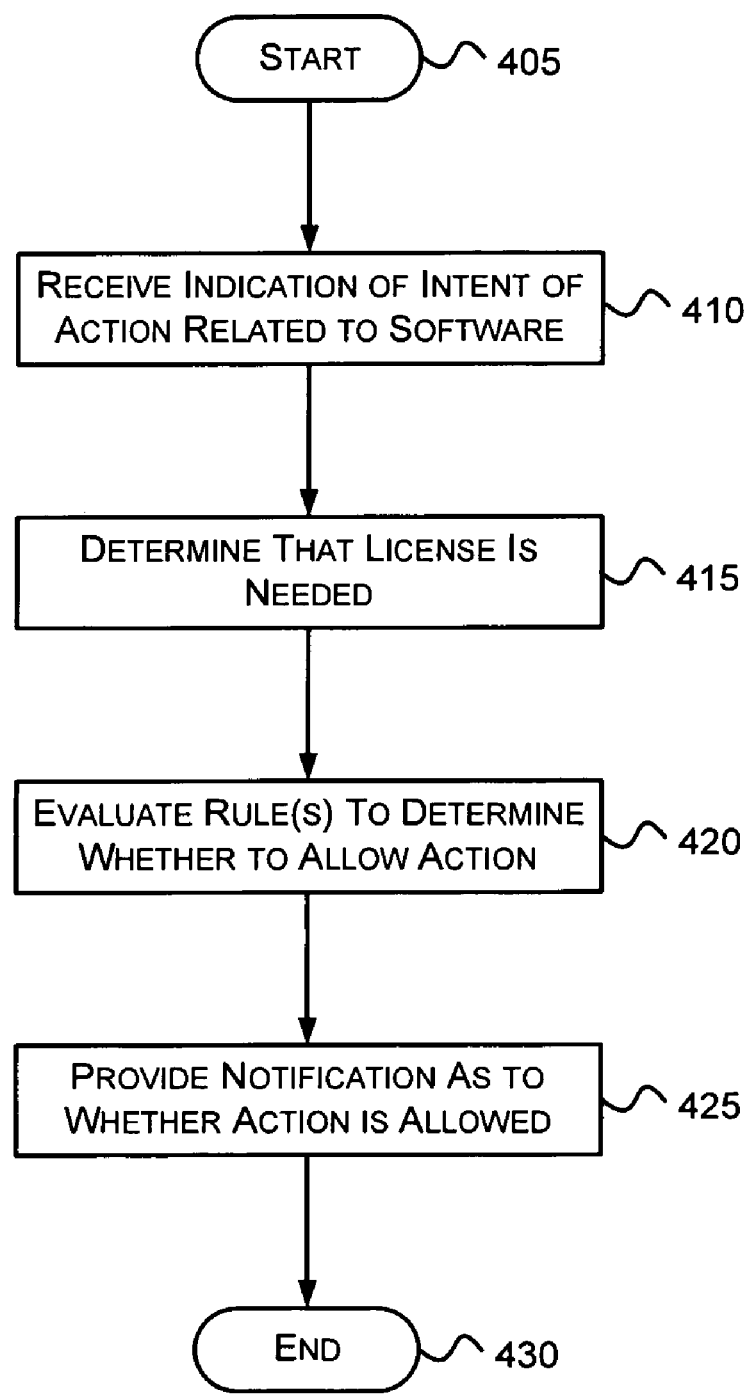
FIG. 4 is a flow diagram that generally represents actions that may occur in another exemplary embodiment in assuring software license compliance in accordance with aspects of the subject matter described herein.

FIGS. 3-4 are flow diagrams that general represent actions that may occur in assuring software license compliance in accordance with aspects of the subject matter described herein. For simplicity of explanation, the methodology described in conjunction with FIGS. 4-6 is depicted and described as a series of acts. It is to be understood and appreciated that aspects of the subject matter described herein are not limited by the acts illustrated and/or by the order of acts. In one embodiment, the acts occur in an order as described below. In other embodiments, however, the acts may occur in parallel, in another order, and/or with other acts not presented and described herein. Furthermore, not all illustrated acts may be required to implement the methodology in accordance with aspects of the subject matter described herein. In addition, those skilled in the art will understand and appreciate that the methodology could alternatively be represented as a series of interrelated states via a state diagram or as events.

FIG. 3 is a flow diagram that generally represents actions that may occur in one exemplary embodiment in assuring software license compliance in accordance with aspects of the subject matter described herein. Turning to FIG. 3, at block 305, the actions begin.

At block 310, an indication of intent of action related to software is received. For example, referring to FIG. 2, the configuration manager 205 may receive an indication of an intent of an action from the user interface 225.

At block 315, a determination is made as to whether the action is constrained based on license and business rule. If the action is constrained, the actions continue at block 330; otherwise, the actions continue at block 320. For example, referring to FIG. 205, the configuration manager consults with the license needs calculation engine 215 and the license business rules engine 220 to determine whether the action is constrained. Constrained does not necessarily mean that the action is not to be performed. In one embodiment, constrained may indicate that the action may be performed but that taking the action will cause a need for more licenses to be paid for or a greater license fee. In another embodiment, constrained may indicate that the action is not to be performed.

At block 320, notification may be provided regarding the impact of the action on available licenses. For example, referring to FIG. 2, the configuration manager 205 may notify a administrator of the remaining number of licenses available, the number of licenses used, types associated with the licenses, financial information related to the licenses, and the like via the user interface 225.

At block 325, the action is allowed to proceed. For example, referring to FIG. 2, the configuration manager 205 may allow the administrator (e.g., via a button or other user interface element) to indicate that the action is to be performed.

At block 330, a notification related to the constraint is provided. For example, referring to FIG. 2, the configuration manager 205 may provide a message to the user interface 225 indicate that the action will cause the number of licenses to be exceeded but that the action is stilled allowed. The configuration manager 205 may also provide a notification (e.g., via e-mail) to a business planner indicated by a rule.

At block 335, the action is optionally stopped from proceeding. For example, referring to FIG. 2, in one embodiment, the configuration manager 205 may not allow the administrator to take the indicated action. In another embodiment, however, the configuration manager 205 may allow the administrator to take the intended action and may audit the administrator's choice.

At block 340, the actions end.

FIG. 4 is a flow diagram that generally represents actions that may occur in another exemplary embodiment in assuring software license compliance in accordance with aspects of the subject matter described herein. Turning to FIG. 4, at block 405, the actions begin.

At block 410, an indication of an intent of an action with respect to software is received. For example, referring to FIG. 2, the configuration manager 205 may receive an indication of an intent of an action from the user interface 225.

At block 415, a determination is made that a license is needed. For example, referring to FIG. 2, the configuration manager 205 populates the intent to the licensing data store 210 and consults with the license needs calculation engine 215 as to whether additional licenses are needed. The license needs calculation engine 215 obtains appropriate information from the licensing data store 210 and determines whether additional licenses are needed and returns an indication of whether additional licenses are needed to the configuration manager 205.

At block 420, one or more rules are evaluated to determine whether to allow the action and/or take other actions (e.g., provide a notification regarding the action). For example, referring to FIG. 220, the configuration manager 205 passes license needs and other information to the license business rules engine 220 and the license business rules engine 220 evaluates one or more rules to determine whether the action is allowed and/or other actions are to be taken.

At block 425, notification is provided as to whether the action is allowed. For example, referring to FIG. 2, the configuration manager 205 informs an administrator via the user interface 225 as to whether the action is allowed. The configuration manager 205 may also provide information as to why the action is not allowed or a warning that the action will cause a need to purchase more licenses.

The configuration manager may also provide additional information regarding the intended action. For example, the configuration manager may indicate a cost associated with taking the action by computing the cost of the licenses used by the action or the cost of the licenses needed to be paid for by taking the action. As another example, the configuration manager may indicate a number, type, and cost of each license needed to fulfill the action.

At block 430, the actions end.

As can be seen from the foregoing detailed description, aspects have been described related to software license compliance. While aspects of the subject matter described herein are susceptible to various modifications and alternative constructions, certain illustrated embodiments thereof are shown in the drawings and have been described above in detail. It should be understood, however, that there is no intention to limit aspects of the claimed subject matter to the specific forms disclosed, but on the contrary, the intention is to cover all modifications, alternative constructions, and equivalents falling within the spirit and scope of various aspects of the subject matter described herein.

What is claimed is:

1. A method implemented at least in part by a computer, the method comprising:
   receiving an indication of an intent of an action related to software, the action potentially affected by a license related to the software;
   using a processing unit, based on stored license entitlement information, determining license need data, the license need data indicating whether or not an additional license is needed to perform the action;
   using a license business rules engine to apply the license need data to determine whether or not the action is to be constrained, the license business rules engine applying business rules, the business rules comprising a software deployment policy, an authorization/access policy and a count-based policy;
   if performing the action is to be constrained, providing a notification; and
   if performing the action is not to be constrained, allowing the action to proceed.

2. The method of claim 1, wherein the action comprises deploying the software to one or more machines.

3. The method of claim 1, wherein the action comprises changing a count associated with the software.

4. The method of claim 3, wherein the count relates to resources used by the software, the resources including one or more of a processor, memory, hard disk space consumed by the software, hard disk space consumed by data used by the software, and energy consumed by physical components used to host the software.

5. The method of claim 1, wherein the action comprises allowing more accesses of the software.

6. The method of claim 1, wherein the business rule is based on a number of licenses paid for.

7. The method of claim 1, wherein the business rule is based on a geographical location in which the software is deployed.

8. The method of claim 1, wherein the notification comprises a message to a user interface and a message to an employee indicated by the business rule.

9. The method of claim 1, further comprising if the action is constrained by license and a business rule disallowing the action.

10. In a computing environment, an apparatus, comprising:
    a computer comprising a licensing data store operable to store information regarding licenses, the stored information comprising entitlement data regarding licenses that have already been or will be purchased;
    a license needs calculation engine operable to receive a request and to determine whether additional licenses are needed based at least in part on the information;
    a rules engine operable to determine whether business rules impact an intended action regarding software affected by at least one license, the business rules comprising a software deployment policy, an authorization/access policy and a count-based policy; and
    a configuration manager operable to consult the license needs calculation engine and the rules engine to determine a response to the intended action.

11. The apparatus of claim 10, wherein the response comprises providing a notification that indicates the intended action will cause a need for more licenses, receiving, from a user interface, an indication to proceed with the intended action, and storing an audit record regarding a user making the indication.

12. The apparatus of claim 10, wherein the action comprises deploying the software on one or more machines.

13. The apparatus of claim 12, wherein at least one of the one or more machines is a virtual machine.

14. The apparatus of claim 10, wherein the action comprises configuring the software.

15. The apparatus of claim 10, wherein the action comprises providing authorization for access to the software.

16. The apparatus of claim 10, wherein the license needs calculation engine determines licenses needed for the action.

17. the apparatus of claim 16, wherein the rules engine includes a rule that allows the action to proceed even if the licenses needed exceeds paid for licenses provided that the licenses needed does not exceed a specified percentage above the paid for licenses.

18. A computer storage medium, the computer storage medium not consisting of a propagating signal, the computer storage medium having computer-executable instructions, which when executed perform actions, comprising:
    receiving an indication of an action with respect to software, the action potentially affected by a license;
    determining that at least one additional license is needed to fulfill the action;
    evaluating one or more rules to determine whether to allow the action, the rules comprising a software deployment policy, an authorization/access policy and a count-based policy; and
    providing notification via a user interface as to whether the action is allowed.

19. The computer storage medium of claim 18, further comprising providing notification via the user interface of a cost associated with taking the action.

20. The computer storage medium of claim 18, further comprising providing, via the user interface, information indicating a number and type of licenses needed to fulfill the action.

* * * * *